June 24, 1952   G. H. COOK   2,601,369
THREE-COMPONENT OPTICAL OBJECTIVES
Filed Jan. 29, 1951
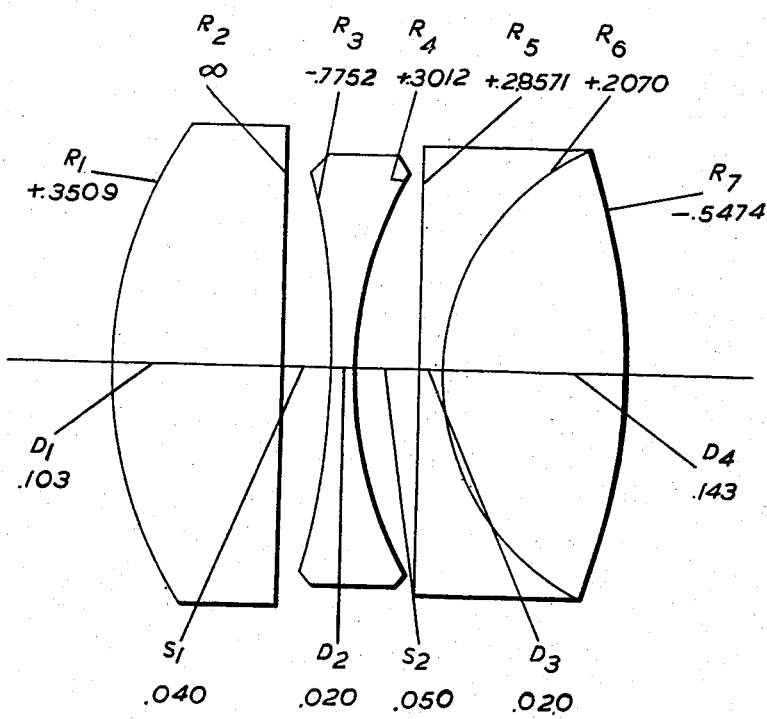
Inventor
GORDON H. COOK
By Emery, Holcombe & Blair
Attorneys Patented June 24, 1952

2,601,369

UNITED STATES PATENT OFFICE 2,601,369

THREE-COMPONENT OPTICAL OBJECTIVES

Gordon Henry Cook, Leicester, England, assignor to Taylor, Taylor & Hobson Limited, Leicester, England, a British company Application January 29, 1951, Serial No. 208,255
In Great Britain February 2, 1950

4 Claims. (Cl. 88—57)

This invention relates to optical objectives for photographic or other purposes, corrected for spherical and chromatic aberrations, coma, astigmatism, field curvature and distortion, and comprising a divergent simple component disposed behind a convergent simple component and in front of a convergent doublet component, and has for its object to provide an objective well corrected for a higher aperture over a wider angular field than is usual in this simple type of objective.

It should be understood that the terms "front" and "rear" as herein used are intended to relate to the sides of the objective respectively nearer to and further from the longer conjugate in accordance with the usual convention.

In the objective according to the present invention, the internal contact surface in the doublet rear component is collective and convex to the front with a radius of curvature between .18 and .25 times the equivalent focal length of the objective, the mean refractive index of the material of the rear element of such doublet exceeding that of the front element thereof by between .03 and .06, whilst the mean refractive indices of the materials of all four elements of the objective are greater than 1.6, the axial distance from the rear surface of the convergent front component to the cemented surface of the doublet being less than half the overall axial length of the objective from the front surface of the front component to the rear surface of the rear component, such overall length lying between .34 and .47 times the equivalent focal length of the objective.

The mean refractive index of the material used for the front element of the doublet component preferably exceeds those of the materials of the two front components of the objective.

The front surface of the doublet is preferably convex to the front with radius of curvature between twice and four times the equivalent focal length of the objective.

A convenient practical example of objective according to the invention is illustrated in the accompanying drawing, and numerical data for this example are given in the following table, in which $R_1$ $R_2$ $R_3$ ... represent the radii of curvature of the surfaces of the objective counting from the front, the positive sign indicating that the surface is convex to the front and the negative sign that it is concave thereto, $D_1$ $D_2$ ... represent the axial thicknesses of the elements of the objective, and $S_1$ $S_2$ represent the axial air separations between the components. The table also gives the mean refractive index $n_D$ for the D-line and the Abbé V number for the materials used for the various elements.

| Equivalent Focal Length 1.000. Relative Aperture F/2.67 | | | |
|---|---|---|---|
| Radius | Thickness or Air Separation | Refractive Index $n_D$ | Abbé V Number |
| $R_1=+$ .3509 | $D_1=$ .130 | 1.6570 | 50.8 |
| $R_2=$ ∞ | $S_1=$ .040 | | |
| $R_3=-$ .7752 | $D_2=$ .020 | 1.6535 | 33.5 |
| $R_4=+$ .3012 | $S_2=$ .050 | | |
| $R_5=+2.8571$ | $D_3=$ .020 | 1.7000 | 41.2 |
| $R_6=+$ .2070 | $D_4=$ .143 | 1.7440 | 44.7 |
| $R_7=-$ .5474 | | | |

In this example, the focal lengths of the three components counting from the front, are respectively .53, .33, and .57 times the equivalent focal length of the objective.

The overall axial length of the objective is .403 times the equivalent focal length, whilst the axial distance from the rear surface of the front component to the cemented surface in the doublet ($S_1+D_2+S_2+D_3$) is .130 times such focal length.

This example is well corrected over a semi-angular field of 26 degrees.

The insertion of equals (=) signs in the radius column of the table, in company with plus (+) and minus (−) signs which indicate whether the surface is convex or concave to the front, is for conformity with the Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

What I claim as my invention and desire to secure by Letters Patent is:

1. An optical objective corrected for spherical and chromatic aberrations, coma, astigmatism, field curvature and distortion, and comprising a convergent simple front component, a divergent simple middle component, and a convergent doublet rear component whose internal contact surface is collective and convex to the front with radius of curvature between .18 and .25 times the equivalent focal length of the objective, the mean refractive index of the material of the rear element of such doublet exceeding that of the front element thereof by between .03 and .06, whilst the materials of all four elements have mean refractive index greater than 1.6, the axial distance from the rear surface of the convergent front component to the internal contact surface in the rear component being less than half the overall axial length of the objective from the front surface of the front component to the rear surface of the rear component, such overall length lying between .34 and .47 times the equivalent focal length of the objective.

2. An optical objective as claimed in claim 1, in which the front surface of the doublet is convex to the front and has radius of curvature between twice and four times the equivalent focal length of the objective.

3. An optical objective as claimed in claim 1, in which the front surface of the doublet is convex to the front and has radius of curvature between twice and four times the equivalent focal length of the objective.

4. An optical objective having numerical data substantially as set forth in the following table:

| Equivalent Focal Length 1.000. Relative Aperture F/2.67. | | | |
|---|---|---|---|
| Radius | Thickness or Air Separation | Refractive Index $n_D$ | Abbé V Number |
| $R_1=+\ .3509$ | $D_1=.130$ | 1.6570 | 50.8 |
| $R_2=\ \infty$ | $S_1=.040$ | | |
| $R_3=-\ .7752$ | $D_2=.020$ | 1.6535 | 33.5 |
| $R_4=+\ .3012$ | $S_2=.050$ | | |
| $R_5=+2.8571$ | $D_3=.020$ | 1.7000 | 41.2 |
| $R_6=+\ .2070$ | $D_4=.143$ | 1.7440 | 44.7 |
| $R_7=-\ .5474$ | | | |

Wherein $R_1\ R_2\ \ldots$ represent the radii of curvature of the surfaces of the objective, the positive sign indicating that the surface is convex to the front and the negative sign that it is concave thereto, $D_1\ D_2\ \ldots$ represent the axial thicknesses of the elements of the objective, and $S_1\ S_2$ represent the axial air separations between the components.

GORDON HENRY COOK.

REFERENCES CITED

The following references are of record in the file of this patent:

UNITED STATES PATENTS

| Number | Name | Date |
|---|---|---|
| 721,240 | Rudolph | Feb. 24, 1903 |
| 2,084,714 | Tronnier | June 22, 1937 |
| 2,308,007 | Herzberger et al. | Jan. 12, 1943 |
| 2,346,086 | Schade et al. | Apr. 4, 1944 |

FOREIGN PATENTS

| Number | Country | Date |
|---|---|---|
| 146,211 | Great Britain | Dec. 30, 1920 |
| 609,669 | Great Britain | Oct. 5, 1948 |